(No Model.) 5 Sheets—Sheet 3.

H. C. BRADFORD.
TAPPING AND THREAD CUTTING MACHINE.

No. 465,827. Patented Dec. 29, 1891.

Witnesses.
O. N. Keeney
Anna V. Faust

Inventor.
Horace C. Bradford
Curtis T. Benedict
Attorney.

THE NORRIS PETERS CO., PHOTO-LITHO., WASHINGTON, D. C.

(No Model.) 5 Sheets—Sheet 4.

H. C. BRADFORD.
TAPPING AND THREAD CUTTING MACHINE.

No. 465,827. Patented Dec. 29, 1891.

Witnesses.
O. N. Keeney
Anna V. Faust

Inventor.
Horace C. Bradford
Curtis T. Benedict
Attorney.

THE NORRIS PETERS CO., PHOTO-LITHO., WASHINGTON, D. C.

(No Model.) 5 Sheets—Sheet 5.
H. C. BRADFORD.
TAPPING AND THREAD CUTTING MACHINE.
No. 465,827. Patented Dec. 29, 1891.
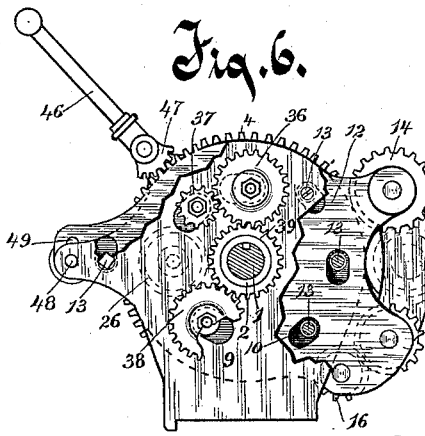
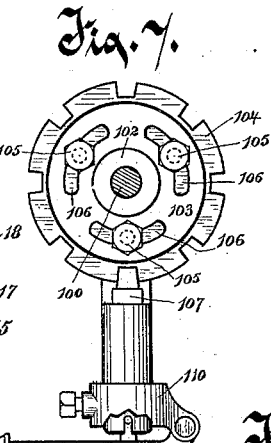
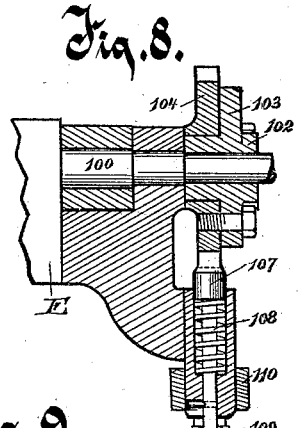
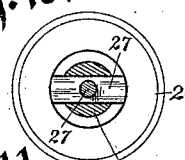
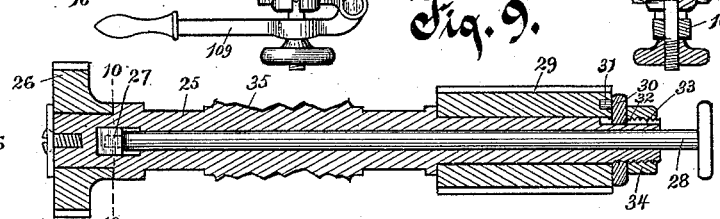
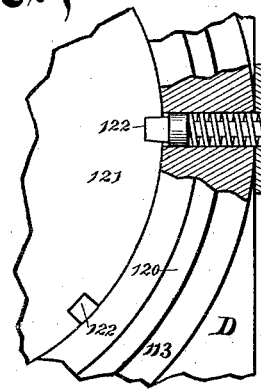
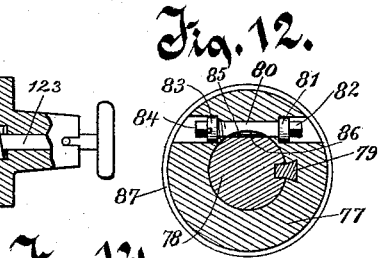
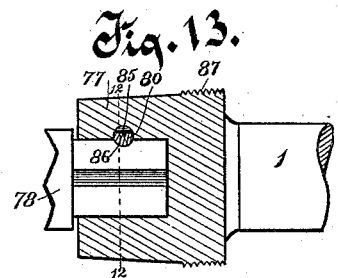
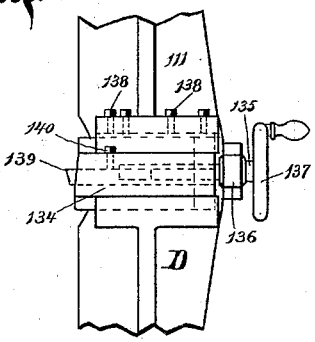
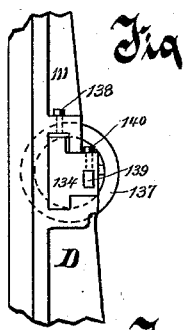
Witnesses.
O. N. Keeney.
Anna R. Faust.
Inventor.
Horace C. Bradford
Curtis T. Benedict
Attorney.
THE NORRIS PETERS CO., PHOTO-LITHO., WASHINGTON, D. C.

UNITED STATES PATENT OFFICE.

HORACE C. BRADFORD, OF MILWAUKEE, WISCONSIN.

TAPPING AND THREAD-CUTTING MACHINE.

SPECIFICATION forming part of Letters Patent No. 465,827, dated December 29, 1891.

Application filed February 19, 1891. Serial No. 382,113. (No model.)

*To all whom it may concern:*

Be it known that I, HORACE C. BRADFORD, of Milwaukee, in the county of Milwaukee and State of Wisconsin, have invented new and useful Improvements in Tapping and Thread-Cutting Machines, of which the following is a description, reference being had to the accompanying drawings, which are a part of this specification.

My invention relates to that class of machines in which a rotary tool carried on a live spindle is adapted for tapping metal articles or devices and for cutting a thread on a pipe or any cylindrical form.

The machine is adapted for cutting or tapping either a right or left handed thread, and the material holder or chuck is arranged to revolve in a plane in the line of the reciprocation of the tool, so that any side or end of the article to be tapped or threaded may be presented to the tool, and is properly designated a "universal tapping and pipe-threading machine."

The object of the invention is to provide a machine that can be readily and exactly adjusted, that is easily manipulated, that is largely automatic in its movements, and that is of great capacity by reason of its easy manipulation, the number and variety of its adjustments, and its automatic operation.

The improvements consist in novel features in the spindle and the spindle-driving mechanism, in the shifting mechanism, the chuck, the chuck-frame, the cutting-off device attached thereto, and in parts related to the above, all of which will be hereinafter more fully described and definitely claimed.

Figure 1:
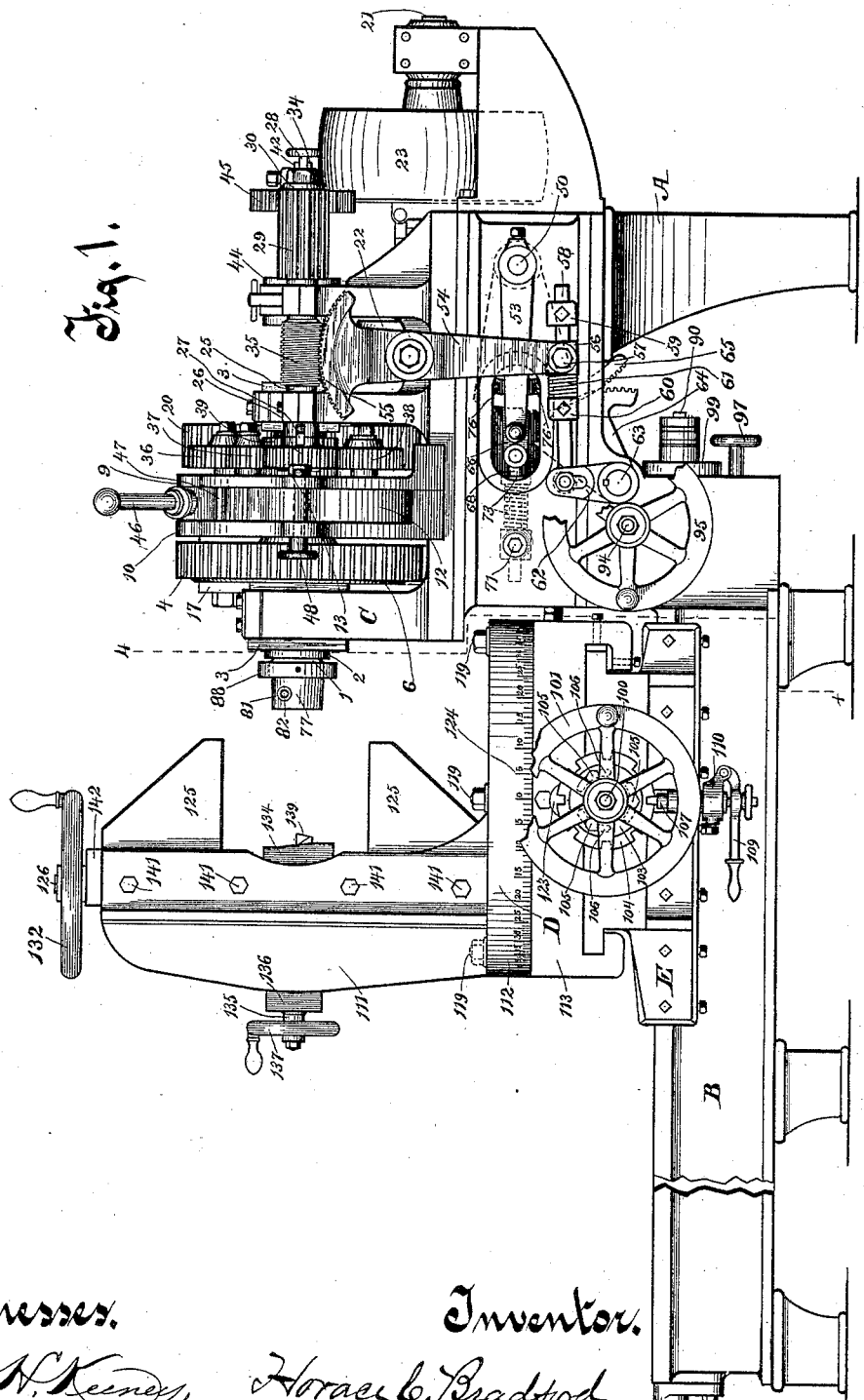
Figure 2:
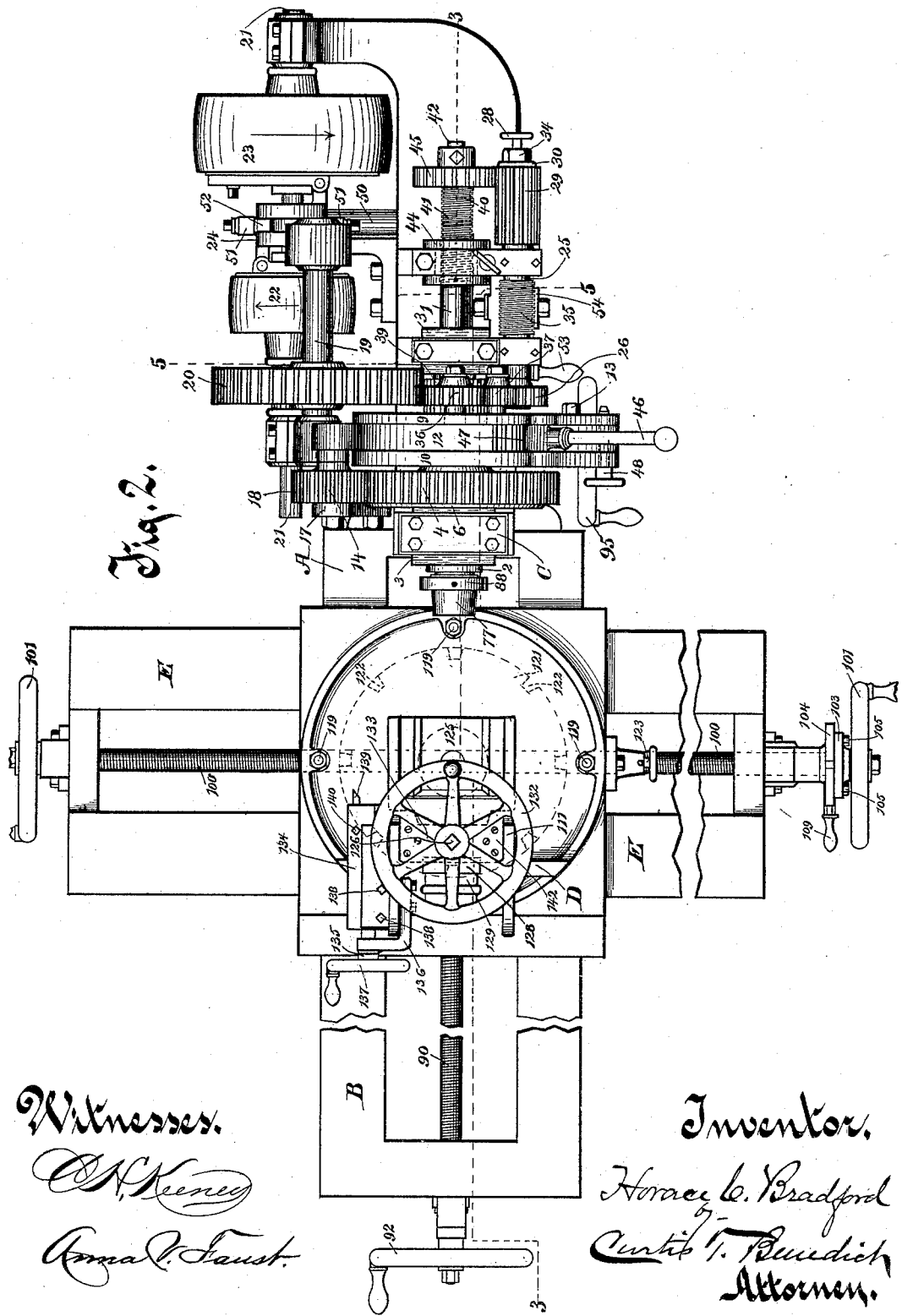
Figure 3:
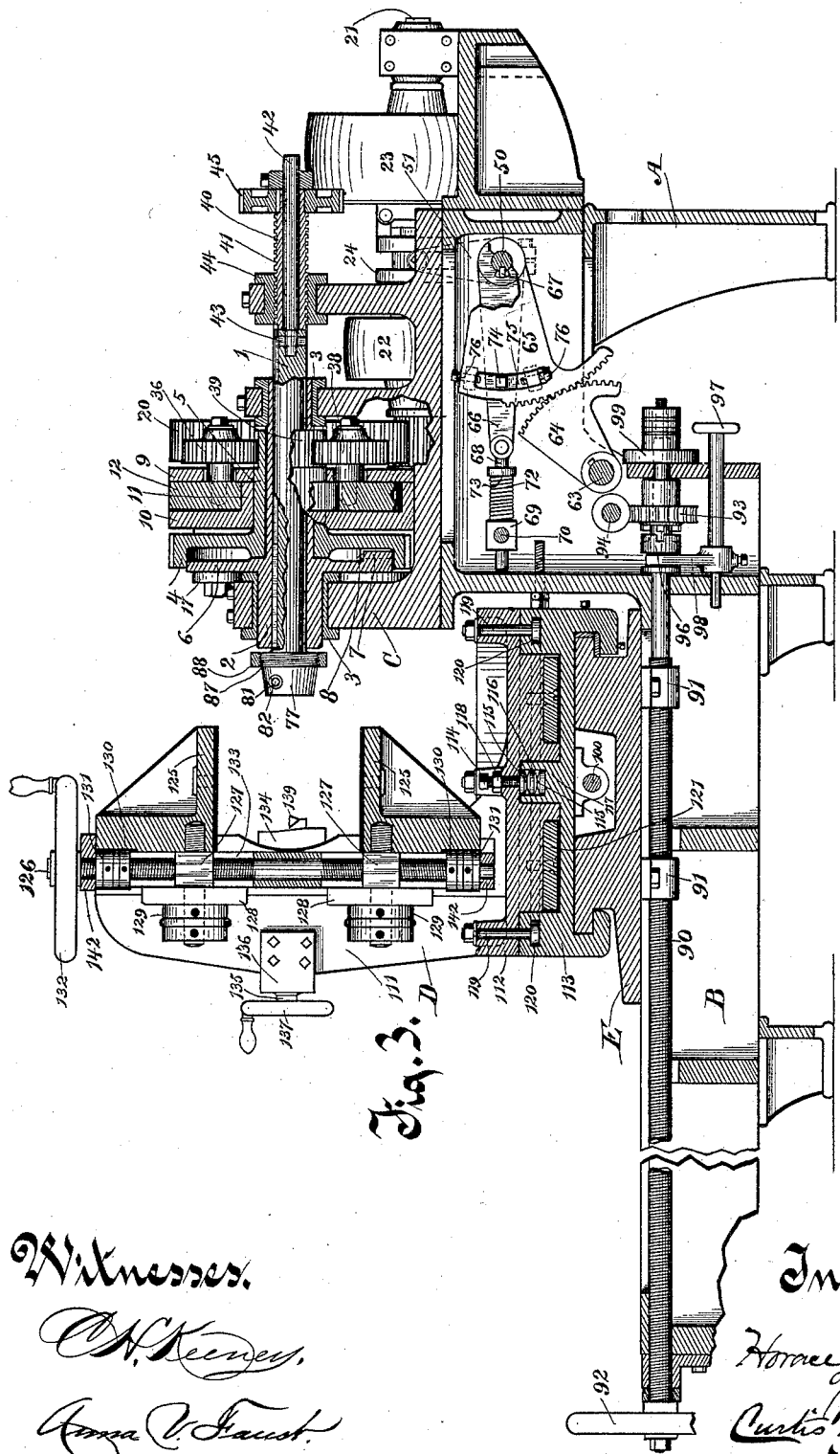
Figure 4:
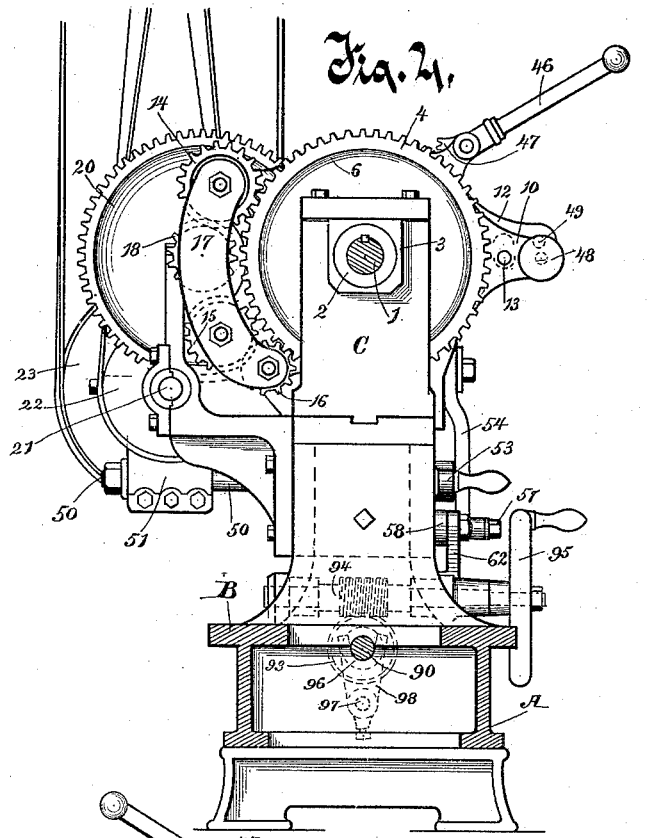
Figure 5:
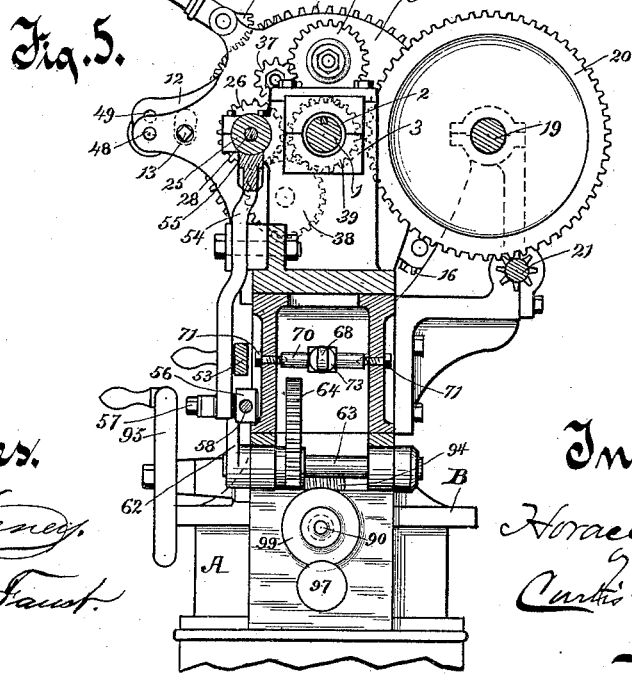

In the drawings, Figure 1 is a side elevation of the complete machine, parts being broken away and omitted for better illustration. Fig. 2 is a top plan view of the complete machine, parts being broken away and omitted for convenience of illustration. Fig. 3 is a longitudinal vertical section of the complete machine on line 3 3 of Fig. 2, parts being broken away to show interior construction and other parts omitted for convenience of illustration. Fig. 4 is an end elevation of the principal mechanism in the head-stock of my machine, the view being taken on line 4 4 of Fig. 1, looking toward the right. Fig. 5 is a view of principal parts of the mechanism in the head-stock, the view being taken on line 5 5 of Fig. 2, looking toward the left. Fig. 6 is a detail view of parts of the mechanism shown in Fig. 5, looking in the same direction, parts shown at the front in Fig. 5 being omitted in Fig. 6 and other parts in Fig. 6 being broken away for exhibiting interior construction. Fig. 7 is a detail of the index-plate attached to the feed-screw and allied parts for shifting the chuck-supporting saddle laterally. Fig. 8 is a central longitudinal section of the parts shown in Fig. 7 at right angles thereto. Fig. 9 is a central longitudinal section of the shifting-shaft, showing the key and method of locking the shaft to the driving mechanism, the worm of the shaft being broken away in the drawings. Fig. 10 is a transverse section of the shifting-shaft on line 10 10 of Fig. 9, looking toward the left, showing the driving-gear thereon. Fig. 11 is a detail of an index-pin, shown in connection with a fragment of the saddle and the index-plate fixed on the foot of the standard of the chuck-frame. Fig. 12 is a transverse section of the spindle head or cone tool-holder on line 12 12 of Fig. 13. Fig. 13 is a central longitudinal section of the spindle-head or tool-holder, taken at right angles to Fig. 12, showing also a fragment of the tool secured therein. Fig. 14 is a side view of a cutting-off device attached to the standard of the chuck-frame, a fragment of which is shown in the view, the cutting-off device being adapted to be used in connection with my tapping and threading machine. Fig. 15 is an inner end view of the cutting-off device shown in Fig. 14.

The main frame A, provided with a bed B, is of such form, size, and strength as to adapt it properly to support the operative parts of the mechanism. The head-stock C is fixed on the main frame and supports the live-spindle and the driving, reciprocating, and shifting mechanism connected therewith.

The chuck-frame is supported on a carriage E, which travels on the bed B. The chuck-frame carries movable chuck-jaws adapted to hold the article to be tapped, screw-threaded or otherwise operated on, and also carries a cutting-off device adapted to be used in connection with the thread-cutting mechanism. The live-spindle 1 is carried in the head-stock, being loose and splined in a sleeve 2, which sleeve is journaled in pillow-blocks 3 3, secured removably in the frame. A driving-wheel 4, having a sleeve-hub 5 projecting from one side thereof, is loose on the sleeve 2. The sleeve 2 is provided with a circular radially-projecting flange 6, having a crown-projecting lug 7, arranged to engage a corresponding lug 8 projecting laterally from the web of the driving-wheel 4 and clutch or lock the driving-wheel to the spindle rotatably subject to the lost motion of nearly one revolution of the driving-wheel on the change of motion thereof. By this construction provision is made for taking up all the play or lost motion of the mechanism by which motion is communicated to the spindle on starting the machinery in one direction or reversing it, before the spindle is started.

Two vertical plates 9 and 10, located at a little distance apart, are fixed on and form a part of the frame of the head-stock, and both are provided with central horizontal apertures through which the hub 5 passes loosely. The plate 10 is provided with an annular flange 11, projecting laterally to the plate 9 and forming a sleeve about the hub 5. A plate 12 is axled loosely on the flange-sleeve 11. The plates 9 and 10 are secured rigidly together by bolts 13, which pass through the plate 12 in slots which permit the limited rotary movement of the plate 12. The plate 12 carries thereon the gear-wheels 14, 15, and 16, loose on pins fixed in the plate and in a segmental re-enforcing plate 17 on the other side of the gear-wheels. The gear-wheel 15 is constantly in mesh with the gear-wheel 16, and the wheels 14 and 16 are constantly in gear with the driving-wheel 4. A pinion 18 on counter-shaft 19 is located between the gears 14 and 15 and in such position as to be put in mesh, as desired, with the gear 14 or 15 by the limited rotation of the plate 12. Counter-shaft 19 is journaled in the head-stock and carries fixed thereon the gear-wheel 20, which meshes with a pinion on the driving-shaft 21. Small and large pulleys 22 and 23 run loose in reverse directions on the shaft 21. A sliding collar 24, splined on the shaft 21, is provided with devices, hereinafter to be described, for shifting it along the shaft and for clutching it either to the pulley 22 or to the pulley 23, as desired, for reversing the motion of the shaft. The driving-wheel 4 and the plate 12 are concentric with spindle 1.

The operative mechanism thus far chiefly described is that used in revolving the spindle and the thereon-carried tool. In connection therewith the mechanism about to be described is used for reciprocating the spindle or feeding it to its work and retrieving it, and therewith, through allied mechanism, adapted and used for automatically shifting the motion of the spindle and the spindle-operating mechanism. A shifting-shaft 25, journaled in the head-stock, carries a gear-wheel 26, revolubly loose thereon, but locked thereto when the shifting mechanism is in use by a transverse key 27, extending diametrically through the shaft 25 in a slot therefor, in which it is movable toward and from the gear-wheel 26, which key enters recesses therefor in the hub of the gear and locks the wheel to the shaft. A stem 28, attached to the key 27, extends lengthwise through the shaft 25, and is adapted for moving the key into or out of engagement with the gear-wheel 26. By withdrawing the key 27 from the gear 26 the shifting mechanism and the spindle-reciprocating mechanism are disconnected operatively from the spindle-driving mechanism, and the spindle may then be used for milling, facing, or cutting articles in which only the continuous rotary motion of the tool is required, the spindle and spindle-driving mechanism continuing to be in position to be thrown into operative connection with the reciprocating and shifting mechanism at any time by putting the key 27 into engagement with the gear 26. The shaft 25 also carries thereon an elongated pinion or gear 29, secured revolubly to the shaft by means of a collar or ring 30, provided with a pin 31, which enters an aperture therefor in the gear 29, which ring is also provided with a tongue 32, fitting movably in a longitudinal groove 33 in the shaft 25. The ring 30 is held up to the gear 29 by a nut 34, turning by screw-thread on the end of the shaft. This means of clutching the gear 29 to the shaft 25 revolubly is provided so that any sudden shock or strain on the machinery reacting on this part of the mechanism would cut or break the pin or tongue of the ring before stronger parts of the machine would give way, and thus by the destruction of this inexpensive ring permit such unrestricted movement of the driving mechanism as would obviate the destruction of more valuable parts. An intermediate boss on the shaft 25 has a worm 35 thereon.

Gear-wheels 36, 37, and 38 are carried loose on studs fixed in the plate 12. These studs pass through the plate 9 in slots therefor, which permit the limited rotary movement of the plate 12. The gears 36 and 38 are constantly in mesh with the gear 39, formed on the sleeve-hub 5 of the driving-wheel 4, and the gear 37 is constantly in mesh with the gear 36. The gear-wheel 26 on the shaft 25 is located between the gears 37 and 38 and in such position as to be put into mesh with either the one or the other of the gears 37 or 38, as desired, by rotating the plate 12. The rotating of the plate 12, that puts the gear 14 or 15 into mesh with the pinion 18, also correspondingly puts the gear 38 or 37 into mesh with the gear 26.

A sleeve 40, having a worm or lead-screw 41, forms a continuation of the spindle 1 and is connected thereto movably by an axial pin 42, on which it revolves. The inner end of the pin 42 is inserted in the end of the spindle 1, and is secured thereto by the transverse key 43. The lead-screw 41 turns in the fixed nut 44 and thereby reciprocates the spindle. A gear 45, fixed on the lead-screw, meshes with the gear 29 on shaft 25 and is driven thereby.

A lever-handle 46 is pivoted medially on the plates 9 and 10, and is provided with a segmental rack 47, meshing with a corresponding rack on the edge of the plate 12, by means of which the plate 12 is rotated sufficiently to throw the wheel 14 or 15 into gear with the pinion 18 and at the same time put the wheel 38 or 37 into gear with the wheel 26. The plate 12 is locked in position by a pin 48, inserted in the plates 9 and 10, and through a corresponding hole 49, of which there are two, in the plate 12. The object of rotating the plate 12, and thereby shifting the gear meshing with the wheels 18 and 26, is to reverse the motion of the mechanism to adapt the machine for tapping a right or left handed thread, as desired.

The mechanism for starting the machine and for automatically reversing its motion and stopping it is the following: A short transverse shaft 50 is journaled in the frame and is provided with a rigid arm 51, which arm at its upper extremity is bifurcate and is provided with bearing-blocks 52, which ride in the groove therefor in the collar 24. The shaft 50 is also provided with a radial lever-handle 53. To start the machine, the free end of this handle is slightly raised by the operator shifting the collar 24 on the shaft 21 toward and into engagement with the larger wheel 23, thereby gearing the mechanism with the driving-shaft 21. A lever 54, pivoted medially on the head-stock, has a segmental worm-gear 55, which meshes with the worm 35, and as the worm rotates under the motion given it from the pulley 23 the lower end of the lever 55 is carried toward the right in Fig. 1. The lever 54 is provided with a headed bolt 56, the shank of which is inserted revolubly in the lever 54, and is held thereto by a nut 57. Rod 58 passes movably through the head of the bolt 56, and is provided with collars 59 and 60, secured adjustably to the rod by set-screws, one on each side of the lever 54. A spring 61 is coiled about the rod 58 between the collar 60 and the bolt 56. By the adjustment of the collars 59 and 60 on rod 58 the extent of the reciprocation of the spindle is regulated, thus limiting and determining the depth of the threadway in the article being tapped or threaded. The rod 58 is connected movably to the wrist of a crank-arm 62, the shaft 63 of which crank is journaled in the frame. The shaft 63 is provided with a rigid segmental rack 64, meshing with a segmental rack 65, loose on the shaft 50.

A radial arm 66, revolubly loose on the shaft 50, is secured thereto by a key 67 inserted in the shaft 50 and extending into a recess therefor in the radial arm 66, whereby as the arm rotates a limited amount of lost motion is provided for between the arm and the shaft, the radial arm rotating the shaft, subject only to the lost motion between the shaft and the arm. At its outer end the arm 66 is pivoted to the rod 68, which passes, movable endwise, through a boss 69 on a pin or shaft 70, pivoted by the bolts 71 in the frame. A spring 72, coiled about the rod 68, is interposed between the boss 69 and a collar 73, rigid on the rod, and is adapted to force the rod 68 and arm 66 downwardly quickly when their knuckle-joint connection is below the dead-center in the line of the shaft 50 and pin 70. A lug 74 on the arm 66 projects therefrom into a segmental slot 75 therefor in the arm 65. Screws 76, turning in nuts therefor on the arm 65 opposite the slot 75, are adapted to adjust and limit the lost motion provided for between the segmental rack 65 and the radial arm 66. As the lower end of the arm 54 is moved outwardly (toward the right in Fig. 1) by the motion communicated thereto through the worm 35 by the motion of the mechanism given it through the pulley 23, the arm engages the collar 59 and carries the rod 58 with it, rotating the shaft 63 and carrying the segmental arms 64 and 65 downwardly, and when the lost motion between the arm 65 and radial arm 66 has been taken up, the arm 66 is started downwardly, taking up the lost motion between it and the shaft 50 until the knuckle-joint, connecting the arm 66 and rod 68, is carried downwardly away from its dead-center, and thereupon the spring 72 acts with sufficient power to throw the arm 66 downwardly, quickly shifting the collar 24 out of engagement with the pulley 23 and into engagement with the pulley 22, whereby the motion of the mechanism including the spindle is reversed. By this reverse motion the arm 66 and the rod 68 are ultimately carried slowly upwardly to the dead-center, (the position shown in Fig. 3,) when the collar 24 will have been moved out of engagement with the pulley 22, remaining midway between pulleys 22 and 23, not being in engagement with either pulley, thereby stopping the machine.

The cone-head of the spindle or tool-holder 77 is provided with a cylindrical socket in its end, in which the cylindrical shank of the tool 78 is inserted, and is secured against rotation therein by a spline 79, preferably dovetailed into the holder and entering a groove therefor in the shank of the tool. The tool is locked in the holder removably by a key 80, the body part of which is a small cylindrical bolt having an enlarged head 81 and a smaller exterior-faced head 82, and is secured in its seat by a nut 83, the bolt being provided with a faced end 84 on its screw-threaded end corresponding with the faced end 82 on the other end. The transverse aperture through the holder in which the key is inserted intersects slightly the socket in which the shank of the tool is received. The shank of the tool is provided with a transverse groove 85, curved in cross-section to receive the cylindrical bolt therein. The cylindrical bolt or key is also provided on one side with a recess 86, curved in longitudinal section to conform with the surface of the shank of the tool, so that by rotating the key in its seat to such position that the recess 86 therein will be toward the shank of the tool, the tool can thereupon be withdrawn from the tool-holder without removing the key from its seat. As tools are sometimes used on the spindle which have a socket in which the cone 77 is inserted, whereby the tool is carried, the cone is provided with a peripheral screw-thread 87 at the rear of the cone on which a nut 88 turns, which nut is adapted to be turned against the end of the tool to force it off the cone.

The carriage E is supported and travels on the bed B lengthwise thereof. Its movement is accomplished by means of the screw 90, having its bearings and rotary movement only in the frame, but turning by its thread through nuts 91 91, fixed on the under side of the carriage E. The screw 90 is provided with a cranked hand-wheel 92 for conveniently rotating it. A more delicate adjustment of the carriage E and the thereon-carried chuck than can be accomplished conveniently by rotating the screw 90 by means of the hand-wheel 92 is provided for by the worm-gear 93 meshing with the worm 94, which worm has its bearings in the frame and is provided with a cranked hand-wheel 95 for rotating it. The worm-gear 93 is loose on the extension of the screw 90, but is clutched thereto temporarily by the clutch-collar 96, splined on the screw, the clutch-collar being arranged to be put into and thrown out of engagement with the worm-gear by means of a sliding hand-rod 97, provided with an arm 98, which rides in an annular groove therefor in the collar 96. A loose collar 99 on the inner end of the screw 90, and secured thereto by jam-nuts, bears against a part of the frame, and prevents the endwise movement of the screw 90 outwardly.

The chuck-frame D is supported on the saddle 113, which travels laterally on the carriage E. Its lateral movement is accomplished by means of a screw 100, having its bearings with rotatable movement only in the carriage E and turning by its thread in nuts fixed on the saddle. The screw is provided with cranked hand-wheels 101, one at each end, for conveniently rotating it. A disk-plate 103, having a hub 102, is fixed on the screw 100 near one end. An annular index-plate 104, loose on the hub 102, is secured adjustably thereto by bolts 105, passing through segmental slots 106 in the disk 103 and turning into the annular index-plate 104. An index-pin 107, movable endwise in a part of the carriage E, is adapted to take into the notches in the index-plate 104 and lock the screw 100 against rotation. The pin 107 is held yieldingly to its seat by a spring 108 bearing against it and against the carriage. A lever-handle 109, pivoted at one end to a collar 110, secured adjustably to a projecting part of the carriage and medially straddling the pin 107 and bearing against its outer head, is adapted to force the pin away from the plate 104. The index-plate 104 is adapted to adjust and properly center the chuck laterally in front of the spindle, and with the pin 107 to hold it in position; but to secure a readjustment of the chuck in front of the spindle and provide for slight variation of position, the slight rotatable movement of the index-plate 104 on the hub of the plate 103 is provided.

For supporting the chuck revolubly on the saddle 113 the standard 111 is provided with a circular or disk foot 112, a downwardly-projecting central and annular portion of which is received in the saddle. The standard 111 is swiveled on the saddle 113 about the stud or pin 117 by means of a bearing-bolt 114, which turns by screw-thread centrally through the foot 112 and at its lower end rests and is supported on oval-faced bearing and anti-friction blocks 115 and 116. The friction-blocks 115, of which there are two, one above and one below the block 116, are oval on their inner faces and bear centrally against corresponding oval faces of the interposed block 116. These blocks 115 and 116 fit movably in a socket therefor in the stud 117. As the bolt 114 is adjustable in the foot 112, the chuck can be let down, so that the foot 112 of the standard will rest on the face of the saddle 113, and in this position is rotatable on the saddle; but when in use the bolt 114 is so adjusted as to raise the foot 112 sufficient to clear the saddle. The bolt 114 is provided with a jam-nut 118 to lock it in position. Bolts 119, inserted loose in the foot 112 near its periphery, project below its lower surface and enter an annular T-shaped groove 120 in the saddle 113, and are adapted to clamp the standard to the saddle adjustably. An annular index-plate 121 is secured rigidly to the under surface of the foot 112, and a spring-actuated pin 123, supported movably in the saddle 113, enters the notches of the plate and locks the chuck in position. These devices provide for swiveling or rotating the chuck horizontally to a desired position at a prescribed angle measured by the location and distance apart of the notches 122. The chuck may also be adjusted at an angle between those secured by rotating the standard to such position that the pin 123 will enter a notch 122 by withdrawing the pin from the plate 121 and rotating the standard to a desired position or angle, which can be ascertained by the graduated peripheral index 124 on the foot 112, and thereupon clamping the foot to the saddle by means of the bolts 119, as in other cases.

Two movable jaws 125, arranged opposite each other and centered above the pivot-pin 117, are carried on a right and left handed or reversely-threaded screw 126, and are arranged to travel toward and from each other at equal distances from the projected axis of the spindle 1. The jaws 125 are each fixed on a nut 127, which nuts are reversely screw-threaded and travel, respectively, on the right and left hand threaded parts of the screw 126. These nuts 127 are provided with rearwardly-extending screws, which pass through bearing-plates 128, and nuts 129, turning on the screws, secure the bearing-plates rigidly to the nuts 127.

The vertical chuck-bed 133 is secured rigidly to the standard 111 by bolts 141, and the inner faces of the plates 128 and the rear ends of the jaws 125 bear against the chuck-bed 133, respectively, at the rear and front thereof opposite each other and travel vertically thereon. Plates 142 are secured at its respective ends to the chuck-bed 133, in which plates the screw 126 has its bearings, and jam-nuts 130, turned on the screw 126 near its respective ends against washers 131, form collars bearing in opposite directions against the plates 142, and preventing the endwise movement of the screw. A cranked hand-wheel 132 on the screw 126 is provided for rotating it.

As the chuck may be rotated horizontally about its vertical axis, the chuck is adapted to hold a section of pipe which may be tapped at one end, and thereupon, by rotating the chuck a half-revolution, the other end—the tap on the spindle being replaced by a thread-cutter—may be threaded without removing the section of pipe from the chuck.

For use in connection with pipe threading and tapping, a device for cutting off pipe is secured to the standard of the chuck, and consists of a head-block 134, movable horizontally in a part of the standard 111 properly constructed therefor, and is carried forward and back by a screw 135, revolving without endwise movement in a bracket 136, secured rigidly to the standard 111, which screw turns by its thread in the block 134. The screw is provided with a cranked hand-wheel 137 for rotating it. The set-screws 138 are adapted to take up wear.

A cutting-tool 139 is inserted horizontally in a socket therefor in the head-block 134, and is secured removably thereto by a set-screw 140. The cutting-tool 139 has a sharp horizontal upper edge, and is adapted to cut off a pipe secured to the head of the spindle 1 by a proper chuck therefor, the chuck for this purpose being turned and arranged at right angles to the spindle. As the standard 111 is rotatable horizontally the edge of the cutting-off tool 139 can be presented against the line of rotary motion of the pipe to be cut off when rotating with the spindle in either direction, and the cutting-off tool can be arranged by adjustment of the chuck-frame to cut off the pipe near to or at a distance from the head of the spindle.

Briefly and in a general way the operation of the machine is as follows: The pipe to be tapped or threaded is placed between the jaws of the chuck and is secured in position by clamping the jaws thereon by rotating the hand-wheel 132. The chuck is rotated horizontally to proper position on the bearing and swivel pin 114 and is locked to the saddle 113 by the pin 122 or by the bolts 119, or both. The carriage E on which the chuck is supported is moved to proper nearness to or distance from the head-stock and cutting-tool by rotating the hand-wheel 92, thereby shifting the carriage. If a particularly delicate adjustment is desired, the screw 90 is rotated limitedly by means of the hand-wheel 95 through the gear 93 clutched to the screw by the collar 96. The saddle 113 and chuck thereon are shifted laterally, as required, to center the work by rotating the hand-wheel 101. A proper tool being secured in or on the tool-holder 77 the machine is set in motion by slightly raising the lever 66, clutching the shaft 21 to the revolving driving-pulley 23. The shaft 21 being thus put in motion rotates the spindle 1 by and through the counter-shaft 19 and gears 14 or 15 and 16, and the wheel 4, subject only to the lost motion therein provided for. The shifting-shaft 25 being keyed or clutched to the wheel 26 is put in motion revolubly by and through the gears 36 or 37 and 38 in mesh with gear 39 on the hub of wheel 4, and thereby the spindle is reciprocated through the rotation of lead-screw 41, actuated by its gear 45 in mesh with gear 29 on the shifting-shaft. The rotation of shaft 25 also, through the worm 35 thereon and the segmental lever 54 actuated thereby and its mechanical connections, actuates the shaft 50 and the arm whereby clutch-collar 24 is shifted on shaft 21 into and out of engagement with pulleys 23 and 22, respectively. By this means, after the machinery has been set in motion by clutching pulley 23 to the shaft 21 and the tool is thereby led up to its work a prescribed distance (determined by the adjustment of collars 59 and 60 on rod 58) the clutch 24 is automatically shifted from pulley 23 to pulley 22 running in the reverse direction, thereby reversing the motion of the machine and retrieving the tool the prescribed distance, when the collar 24 is again automatically shifted and released from engagement with the pulley 22, and the machine stops. To reverse the motion of the tool from right to left or vice versa, the plate 12 is rotated limitedly, shifting the gear, as hereinbefore set forth.

The mode of the various adjustments of the mechanism and the other uses and methods of operation of the machine will be understood from the foregoing description and statements.

What I claim as new, and desire to secure by Letters Patent, is—

1. The combination, in a tapping-machine, of a limitedly-rotatable plate axled about the live-spindle and two sets of gears, as 14, 15, and 16, journaled thereon, which sets of gears are constantly in mesh with the driving-wheel of the spindle and are adapted by the limited rotation of the plate to be put respectively in engagement with the driving mechanism, whereby the direction of the rotation of the spindle is reversed, substantially as described.

2. In a tapping-machine, a rotatable plate, as 12, gears 14, 15, and 16, journaled segmentally thereon, the gear 14 being located at a distance from the gear 15 and on the opposite side of the interposed driving-gear, a strengthening-plate, as 17, and suitable means for rotating the plate 12 limitedly, substantially as described.

3. In a tapping-machine, a gear-supporting plate journaled revolubly about the live-spindle, a rack in its periphery, a lever-handle 46, pivoted medially in the head-stock and having a segmental head meshing with the peripheral teeth of the plate, and a pin 48, insertible through the head-stock and through the movable plate to lock it in position, substantially as described.

4. In a tapping-machine, a plate rotatable in the head-stock about the live-spindle, sets of gears, as 36, 37, and 38, journaled thereon, which gears are constantly in operative connection with a gear on the hub of the spindle-driving wheel and are arranged to be by the rotation of the plate put respectively into mesh with the shifting-shaft, substantially as described.

5. In a tapping-machine, a plate, as 12, revoluble in the head-stock about the spindle, sets of gears supported thereon, which gears are adapted, respectively, to be put into engagement with the spindle-driving mechanism by the limited rotation of the plate, and other sets of gears supported on the plate, which gears are adapted, respectively, to be put into engagement with the shifting-shaft by the same limited rotation of the plate, all combined substantially as described.

6. In a tapping-machine, two parallel plates, as 9 and 10, fixed on and forming a part of the head-stock and having a central aperture through which the spindle passes, a flange, as 11, constructed on one of the plates and forming a sleeve about the spindle extending to the other plate, a shifting gear-carrying plate 12, interposed between the plates 9 and 10, rotatable on the flange 11, and gears on the plate 11, meshing with a gear on the hub of the driving-wheel about the spindle, all combined substantially as described.

7. In a tapping-machine, a rotating spindle, a lead-screw revolubly loose thereon, a nut in the head-stock in which the screw turns and thereby moves the spindle endwise, a gear rigid on the screw, a shifting-shaft, an elongated gear on the shifting-shaft meshing with the gear on the screw, and other gear on the shifting-shaft meshing with intermediate gear, which intermediate gear meshes also with a gear on the hub of the spindle-driving wheel, combined substantially as described.

8. In a tapping-machine, the combination, with the spindle-driving mechanism, of gear 26, loose on the shifting-shaft and meshing with the driving mechanism, the spindle-shaft, and a movable key or clutch adapted to lock the shaft to the gear 26, substantially as described.

9. In a tapping-machine, the combination, with a shifting-shaft, as 25, and a gear, as 29, loose thereon, which gear meshes with a gear on the lead-screw of the spindle, of a ring or collar 30, splined on shaft 25 and provided with a pin which enters the gear 29 and locks the gear to the shaft, the locking device being constructed of such strength as to carry the ordinary strain of the mechanism, but to break or be cut off under unusual strain, substantially as described.

10. In a tapping-machine, the combination of a shifting-shaft having a worm 35, a lever 54, having a segmental worm-gear meshing with the worm 35, a rod 58, connected to the lever 54 and to the crank of a shaft 63, shaft 63, an arm 64, fixed on shaft 63 and having a segmental rack, an arm 65, having a segmental rack meshing with the rack on arm 64, a shaft 50, carrying the arm 65 loose thereon, an arm 66, carried on shaft 50, a rod 68, pivoted to the arm 66, which rod 68 is supported loose in a pin 70, a spring 72, coiled about and actuating the rod 69 endwise, an arm 51, rigid on the shaft 50 and riding at its free end in a clutch sliding on the driving-shaft, all combined substantially as described.

11. In the automatic shifting mechanism of a tapping-machine, a shaft 50, having an arm riding in a clutch on the driving-shaft, a radial arm 66 loose on the arm 50, but so keyed thereto as to provide for a limited amount of lost motion between the shaft and the arm, a rod 68, pivoted to the free end of the arm 66, the other extremity of which rod 68 is supported loose in a rotatable pin 70, and a spring 72, interposed between a collar on the rod 68 and the pin 70, which spring is adapted to swing the arm 66 away from the right line between the shaft 50 and the pin 70, all combined substantially as described.

12. In the shifting mechanism of a tapping-machine, the combination, with a collar-shifting shaft 50, and an arm 66, keyed on the shaft, of a segmental arm 65, loose on shaft 50, which arm has a segmental gear, an arm 64 on a shaft 63, the arm 64 being provided with segmental gear meshing with the segmental gear on arm 65, and a lug 74 on the arm 66, projecting into a segmental slot in the arm 65 and adapted to engage the arm 65 at the ends of the slots, whereby a prescribed amount of lost motion is provided for between the arms 65 and 66, all combined substantially as described.

13. In the shifting mechanism of a tapping-machine, a shaft 50, a thereon-carried radial arm 66, keyed to the shaft so as to have lost motion thereon, a radial arm 65, loose on shaft 50, a lug 74 on the arm 66, projecting into a segmental slot in the arm 65, and set-screws 76 turning in the arm 65 into the ends of the segmental slot and limiting the lost motion between the arms 65 and 66, all combined substantially as described.

14. In the shifting mechanism of a tapping-machine, the combination, with a medially-pivoted lever 54, actuated by a worm on a shaft, and a bolt 65, pivoted in the lever-arm, of a rod 58, inserted movably through the bolt 65, and connected at its other extremity with the crank of a shaft, collars 59 and 60, adjustable on the rod 58, and a spring 61, interposed between the arms 54 and collar 60, substantially as described.

15. In the shifting mechanism in a tapping-machine, the combination, with a clutch-shifting shaft 50, of a shaft 66, a spring-actuated rod 68, toggle-jointed with the arm 66, and a lever-handle 53, rigid on the shaft 50, substantially as described.

16. A tool-holding device consisting of a spindle-head having a cylindrical socket in its end, a transverse aperture partially intersecting the tool-holding aperture, and a cylindrical key inserted in the transverse aperture, which key is provided with a curved recess, adapting it to be rotated out of the groove in the shank of the tool, so as to permit the removal of the tool without the removal of the key, substantially as set forth.

17. The combination, with a spindle-head having a cylindrical socket for the reception of the cylindrical shank of the tool, of a cylindrical key inserted in a transverse aperture through the tool-holder, which aperture intersects the tool-holding aperture, the key having a curved recess, whereby it can be rotated out of the shank of the tool, and faced ends on the key for receiving the wrench thereon, whereby it can be rotated, substantially as described.

18. The combination, with a cone-faced tool-holding spindle-head, of a nut turning by a screw-thread on the rear larger part of the spindle-head, as and for the purpose set forth.

19. In a tapping-machine, the combination, with the frame having a bed, a carriage traveling thereon, a screw for shifting the carriage, which screw rotates in the frame and turns in nuts fixed on the carriage and provided with a hand-wheel for rotating it, of the additional rotating device consisting of a worm 94, provided with a hand-wheel for rotating it, a worm-gear loose on the screw, a collar-clutch splined on the screw arranged to be shifted into engagement with the worm-gear, and means for shifting the collar, substantially as described.

20. In a tapping-machine, the combination, with a frame carrying a live-spindle and having a flat bed, of a longitudinally-traveling carriage, a saddle supported and traveling laterally on the carriage, and a chuck swiveled on the saddle, substantially as described.

21. In a tapping-machine, the combination, with a frame and a live-spindle, of a chuck having jaws, the chuck being swiveled on the frame, so as to rotate in front of the spindle about a central axis through the jaws at right angles to the spindle, substantially as described.

22. In a tapping-machine, a saddle, a thereon supported and swiveled chuck-frame, and bolts inserted loosely in the chuck-frame, the heads of which extend below the chuck-frame and are arranged to travel in an annular groove in the saddle, the bolts being adapted to clamp the chuck-frame releasably to the saddle, combined substantially as described.

23. In a tapping-machine, a saddle having a central stud or pin, a thereon-supported chuck-frame rotatable about the central pin, a bearing-screw turning through the chuck-frame against the central pin and adapted to support the chuck-frame pivotally on the saddle, combined substantially as described.

24. In a tapping-machine, a chuck-frame, a bearing-screw turning centrally through the foot of the frame, oval-faced bearing-blocks arranged to bear against and swivel on each other supported centrally beneath the chuck-frame and supporting the chuck-frame thereon through the central bearing-screw in the front thereof, combined substantially as described.

25. In a tapping-machine, the combination of a chuck-frame swiveled on a saddle, an index-plate 121, fixed on the chuck-frame, and a saddle-carried pin adapted to lock the chuck-frame in prescribed positions to the supporting-saddle, substantially as described.

26. In a tapping-machine, the combination of a saddle, a chuck-frame supported and swiveled thereon, a graduated peripheral index 124 on the chuck-frame, and means for clamping the chuck-frame to the saddle, substantially as described.

27. In a tapping-machine, the combination, with a suitable supporting device, of a chuck-frame, a thereto-fixed index 121, having index-notches at prescribed distances apart, a graduated peripheral index 124, and means for clamping the chuck-frame to the supporting device, substantially as described.

28. In a tapping-machine, the combination, with the standard of the chuck-frame, of a pipe-cutting-off device consisting of a movable head-block 134, a therein-fixed cutting-tool 139, and suitable means for adjusting the block with its cutting-tool up to its work and for locking it in position, substantially as described.

29. In a tapping and threading machine, the combination, with the frame and a live-spindle carried thereon, of a swiveled chuck-frame located in front of the live-spindle, and a pipe-cutting-off tool secured to the standard of the chuck-frame at one side of its axis of rotation, the tool being thereby adapted to cut off a pipe against the line of its rotary motion on the live-spindle and when it rotates in either direction, substantially as described.

30. In the mechanism for shifting the chuck-frame of a tapping-machine, a screw 100, a thereto-affixed radially-projecting plate 103, provided with a hub 102, an index-plate 104, revoluble on the hub 102, screws passing through slots in the plate 103 and turning into the plate 104, adapted to secure the index-plate adjustably to the plate 103, and suitable means for locking the index-plate to the radial plate, combined substantially as described.

In testimony whereof I affix my signature in presence of two witnesses.

HORACE C. BRADFORD.

Witnesses:
C. T. BENEDICT,
ANNA V. FAUST.